(No Model.)

E. L. BABCOCK & E. D. SCHMITT.
FRICTION CLUTCH MECHANISM.

No. 511,320. Patented Dec. 26, 1893.

Witnesses:
Inventors
Erskine L. Babcock
Edward D. Schmitt
By their Attorneys
Gifford & Law

United States Patent Office.

ERSKINE L. BABCOCK AND EDWARD D. SCHMITT, OF CUYAHOGA FALLS, OHIO, ASSIGNOR TO THE FALLS RIVET AND MACHINE COMPANY, OF SAME PLACE.

FRICTION-CLUTCH MECHANISM.

SPECIFICATION forming part of Letters Patent No. 511,320, dated December 26, 1893.

Application filed April 8, 1893. Serial No. 469,535. (No model.)

*To all whom it may concern:*

Be it known that we, ERSKINE L. BABCOCK and EDWARD D. SCHMITT, of Cuyahoga Falls, in the State of Ohio, have invented a new and useful Improvement in Friction-Clutch Mechanism, of which the following is a specification.

Figure 1:
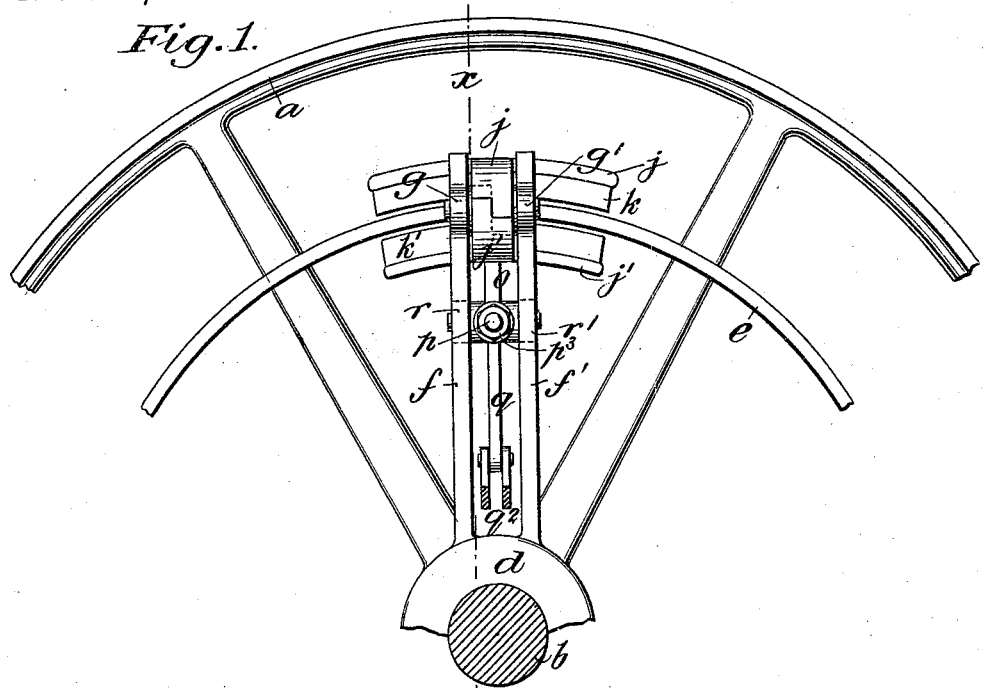
Figures 2, 3, 4:
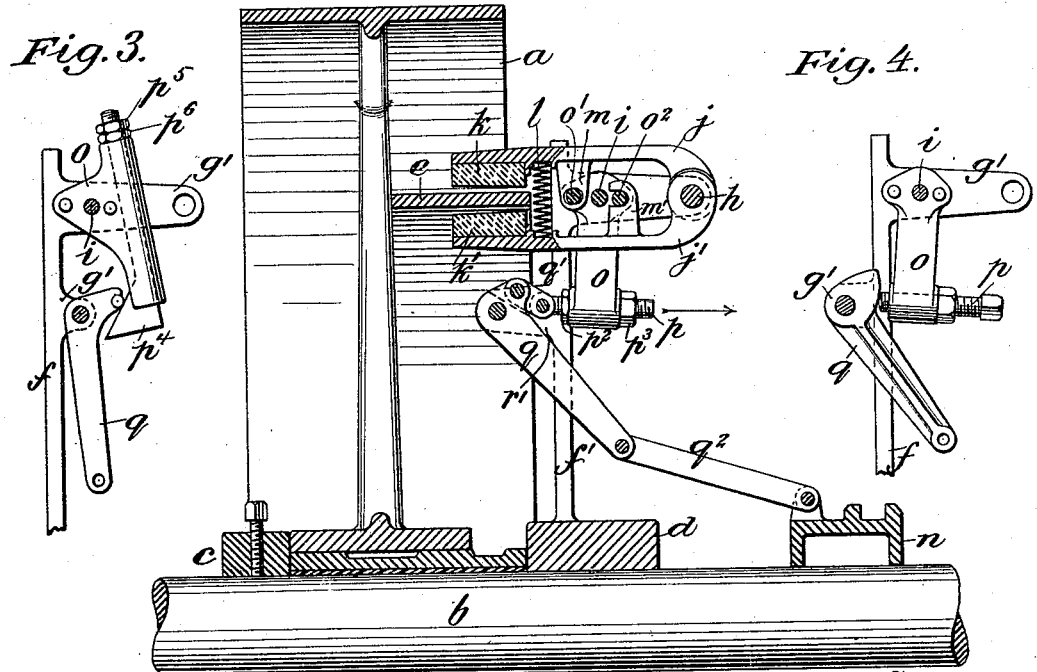

In the drawings, Figure 1 is an end view of a portion of a pulley and of the friction clutch mechanism. Fig. 2 is a longitudinal section of the same through the line $x\,x$ of Fig. 1. Fig. 3 is a modification of certain of the parts and Fig. 4 is another modification of the same.

$a$ is a pulley free to revolve upon the shaft $b$ between the collars $c$ and $d$ both of which collars are fixed to the shaft.

$e$ is a friction-ring fixed upon the pulley.

$f f'$ are two parallel arms fixed to the collar $d$ and projecting radially therefrom. From each of these arms opposite the ring $e$, projects backward an ear $g\,g'$ parallel with one another. Between these arms extend the pivots $h$ and $i$. Upon the pivot $h$ between the ears $g$ and $g'$, are hinged the jaws $j$ and $j'$ extending forward on either side of the friction-ring $e$ and provided with the wooden friction-blocks $k\,k'$. Between these jaws is interposed a coil-spring $l$ which tends to hold them apart. Fixed to the jaws are the inversely extending lugs $m\,m'$ each provided at its extremity with an opening suitable for pivotal connection on opposite sides of the pivot $i$. Now, it will be seen, that when the jaws $j$ and $j'$ are drawn together, a friction connection will be made between the blocks $k\,k'$ and the ring $e$; but when the jaws are not drawn together, they will be held apart so as to break the friction connection by the spring $l$. The prime mover by which this operation is effected, is a sleeve $n$ of ordinary construction on the shaft $b$ and we have illustrated in Figs. 2, 3 and 4 respectively, three modifications of mechanism whereby the movement of this prime mover is transmitted to the jaws.

In Fig. 2, upon the pivot $i$ is mounted a rocker $o$ pivotally connected with the ears $m$ and $m'$ by the pivots $o'$ and $o^2$ respectively. Through the long arm of this rocker, passes a set screw $p$ provided with the nuts $p^2$ and $p^3$ by which it may be adjusted in different positions in the rocker $o$. $q$ is an angle-lever fulcrumed between the ears $r\,r'$ fixed to the arms $f f'$, respectively. One arm of the lever $q$ is coupled to the end of the set screw $p$ by the link $q'$, and the other arm of the lever $q$ is coupled to the sleeve $n$ by the link $q^2$. Now, it is evident that when the parts are in the position shown in Fig. 2 the friction clutch is released, but by forcing the sleeve $n$ toward the collar $d$, the short arm of the lever $q$ and the link $q'$ act together as a toggle joint to force the rocker in the direction of the arrow and draw the two jaws together in antagonism to the spring $l$. It will also be observed that owing to the disposition of the parts of the clutch mechanism, as it is swung round by the shaft in its unclutched position, there will be no substantial tendency for centrifugal force to cause the jaws to advance toward each other.

In Fig. 3 the angle lever $q$ instead of being coupled to a set screw on the rocker bears against the inclined side of a slide $p^4$ adjustably mounted in the rocker $o$ and held to any suitable adjustment by the nuts $p^5 p^6$.

In the modification shown in Fig. 4, the short arm of the lever $q$ is cam shaped and bears against the extremity of the set screw $p$ which may be adjusted in the rocker $o$. The cam formation on the lever $q$ here performs the function of the incline on the slide $p^4$ of Fig. 3 and the adjustment of the set screw $p$ performs the function of the adjustment of the slide $p^4$.

In all modifications shown, when the jaws are released they are held substantially equidistant from the friction-ring because the position of the rocker $o$ is fixed by the pivot $i$ and the position of the jaws with respect to the rocker are substantially fixed by the pivots $o'\,o^2$ which fit snugly, in the direction of the radius from the shaft but are allowed sufficient play in a direction parallel with the shaft $b$ to provide for the rotary motion of the rocker $o$.

We are aware of the patent to J. W. Dawson, No. 299,205, dated May 27, 1884, in which a pair of jaws operating as levers of the first order are pivoted to a clutch and fixed to the shaft, and engage at one end a friction-ring fixed to a spool or pulley and at the other end are forced apart by a wedge-block mounted between them upon a sleeve, and we make no claim for such contrivance.

We claim—

1. In combination, a shaft, a pulley, a friction ring fixed thereto, a clutch arm fixed to the shaft, a pair of jaws pivoted at one end upon the clutch arm and engaging at the other end with the friction ring, a spring whereby said jaws are held apart, a rocker pivotally connected with said clutch arm and with said jaws intermediate their ends, a sleeve on the shaft and means whereby the motions of said sleeve are communicated to said rocker, substantially as described.

2. In combination a shaft, a pulley, a friction ring fixed to the pulley, a clutch arm fixed to the shaft, the jaws engaging at one end with the friction ring and pivoted at the other end to the clutch arm, the spring whereby said jaws are held apart, the rocker pivotally connected with the clutch arm and with the jaws whereby the jaws are held equidistant from the friction ring, a sleeve upon the shaft and means whereby the motions of said sleeve are communicated to said rocker, substantially as described.

3. In combination the shaft, the pulley, the friction ring fixed to the pulley, the clutch arm fixed to the shaft, the jaws pivoted at one end to the clutch arm and engaging at the opposite end with the friction ring, the spring whereby the jaws are held apart, the rocker pivotally connected to the clutch arm and to the jaws, a lever $q$, a link $q^2$, a sleeve upon the shaft and adjusting mechanism whereby the position of the jaws may be adjusted relatively to the sleeve, substantially as described.

4. In combination a shaft, a pulley, a friction ring fixed upon the pulley, a clutch arm fixed to the shaft, jaws pivoted at one end to the clutch arm and engaging at the other end with the friction ring, a spring whereby said jaws are thrust apart, a rocker pivotally connected to said clutch arm and said jaws and containing a long arm extending radially inward toward the shaft, whereby the position of the jaws may be adjusted relatively to the sleeve, a sleeve upon the shaft, adjusting mechanism at the extremity of said long arm, whereby the position of the jaws may be adjusted relatively to the sleeve and means whereby the motions of said sleeve are transmitted to said adjusting mechanism, substantially as described.

5. In combination a shaft, a pulley, a friction ring fixed to the pulley, a clutch arm fixed to the shaft, jaws pivotally connected at one end with the said clutch arm and engaging at the opposite end with said friction ring, a spring whereby said jaws are thrust apart, a rocker pivotally connected with said clutch arm and said jaws, a sleeve upon the shaft, a lever pivoted to the clutch arm, a link interposed between said lever and said sleeve and another link interposed between said lever and said rocker, substantially as described.

ERSKINE L. BABCOCK.
EDWARD D. SCHMITT.

Witnesses:
THOS. F. WALSH,
J. A. LONG.